United States Patent [19]

Guillerme et al.

[11] 4,035,289

[45] July 12, 1977

[54] PURIFYING TREATMENT FOR EFFLUENTS OF MINERAL OIL DRILLINGS

[75] Inventors: Michel Guillerme; Jaime Gratacos, both of Morlaas; Andre Sirvins; Bernard Tramier, both of Pau, all of France

[73] Assignee: Societe Nationale Elf Aquitaine (Production), Courbevoie, France

[21] Appl. No.: 635,179

[22] Filed: Nov. 25, 1975

[30] Foreign Application Priority Data

Nov. 26, 1974 France .............................. 74.38681

[51] Int. Cl.$^2$ ........................................ C02C 1/02
[52] U.S. Cl. ................................. 210/11; 195/3 R; 210/15; 210/51
[58] Field of Search ............. 166/66; 195/3 R, 3 H; 210/2, 11, 15, 42, 4–8, 51

[56] References Cited

U.S. PATENT DOCUMENTS

| | | | |
|---|---|---|---|
| 2,259,419 | 10/1941 | Hefley et al. ...................... | 195/3 R |
| 3,152,983 | 10/1964 | Davis et al. ........................ | 195/3 H |
| 3,660,278 | 5/1972 | Mimura et al. ..................... | 210/11 |
| 3,728,253 | 4/1973 | Kaufman .............................. | 210/5 |
| 3,763,038 | 10/1973 | Misaka et al. ................... | 210/11 X |
| 3,871,956 | 3/1975 | Azarowics ...................... | 195/3 H X |
| 3,933,627 | 1/1976 | Fusey .............................. | 195/3 H X |

OTHER PUBLICATIONS

Davis, *Petroleum Microbiology,* 1967, pp. 486–498.

*Primary Examiner*—Frank A. Spear, Jr.
*Assistant Examiner*—Robert H. Spitzer
*Attorney, Agent, or Firm*—Ostrolenk, Faber, Gerb & Soffen

[57] ABSTRACT

Purification of the effluents from mineral oil drillings, carried out on land, for permitting the discharge of the residual waters into the natural surroundings. First, microorganisms are cultivated on a volume of the effluent, in order to make them capable of digesting the impurities of the effluent. The culture, thus obtained, is then developed in the mass of the effluent to be treated until the BOD is reduced to the required limit. This treatment is preferably followed by a flocculation with chemical agents in the known manner. This anti-pollution treatment permits the regulations in force to be applied in all locations where the drillings are undertaken, whatever may be the auxiliary fluids used in the drilling operation.

7 Claims, No Drawings

PURIFYING TREATMENT FOR EFFLUENTS OF MINERAL OIL DRILLINGS

The invention is concerned with a method of making non-pollutant the effluents which originate from mineral oil drillings.

In the search for hydrocarbons, by drilling in the earth, large quantities of fluid sludges are produced which contain substances harmful to flora and fauna; these effluents therefore have to be subjected to a purification treatment before being discharged into natural surroundings, particularly into the rivers or water planes. The volumes of sludge which thus have to be treated may be of the order of 6,000 to 15,000 cubic meters for each drilling, depending on the depth to be reached, the climatic conditions and the nature of the drilling fluids which are used. It is particularly the chemical products used in the drilling fluids which make the sludges polluting.

The legislation which is in force sets strict conditions concerning the discharge of drilling liquids into natural media. It is in fact necessary for the temperature of this liquid not to exceed 30° C, for the pH to be between 5.5 and 8.5, and the materials in suspension being at most in the concentration of 30 mg per liter and the hydrocarbons at 5 mg per liter; the biochemical oxygen demand (BOD) of these liquids should not exceed 40 mg/l and the chemical oxygen demand (COD) should not exceed 120 mg/l. In addition, so as to satisfy the existing regulations, the drilling effluents are treated in basins, called "mud pits," with flocculents, such as ferric chloride or aluminium sulphate, by lime and by an organic polyelectrolyte. Simple acidification, followed by a decantation, as formerly carried out, is no longer sufficient at the present time. The physicochemical treatment with the afore-mentioned flocculents makes possible the elimination of the materials in suspension, the suitable lowering of the chemical oxygen demand and the correction of the colour and smell. This treatment is thus used at the present time with success in numerous cases. However, experience has shown that the effluents as thus treated still present a too strong biochemical oxygen demand and this is particularly the case when the effluents originate from drillings where the fluids are based on lignosulphonates or biopolymers which are very greatly preferred at the present time by the drilling technicians.

The purification of the drilling effluents thus encounters the insufficiency of the existing physicochemical processes when it is a matter of sludges which have a high BOD and particularly those which contain lignosulphonates or biopolymers used for facilitating the drilling.

The present invention provides an improvement in the anti-pollution treatment of the effluents from mineral oil drillings. It makes possible the suppression of the major part of the BOD of the effluents, which cannot be sufficiently purified by the known physicochemical treatments. Combined with one or more conventional treatments, the new process according to the invention makes possible a purification of the effluents, which broadly conforms to legal requirements.

The process of the invention consists in subjecting the effluent from a mineral oil drilling to the action of microorganisms obtained by the seeding of a portion of this effluent with a strain taken from a microbiological cleansing medium for sewage waters, followed by aerobic culture with supply of only those of the nutritive elements which are not to be found in the effluent.

More particularly, when it is a question of effluents formed by sludges containing adjuvants of which the molecule comprises carbon atoms, as is the case with the lignosulphonates or the polysaccharides which are known under the name of "biopolymers," the culture is supplied with nitrogen and phosphorus containing nutritive materials, as well as oligoelements, with exclusion of any carbonbearing substance. This culture procedure is thus very different from that which is normally carried out, since in the known processes, the culture of the desired strains is always achieved with simultaneous addition of carbon hydrates and nitrogen compounds. By depriving the medium of any carbonaceous substance, which normally can be consumed by the microorganisms, the latter are compelled to attack the carbonaceous substances which are present (lignosulphonates in particular), which are more difficult to use. Because of this particular feature of the invention, the effect obtained is that the bacteria of the activated sewage sludges are made capable of degrading lignosulphonates, this being an unexpected result since these bacteria are normally incapable of achieving this.

Thus, despite the particular chemical composition of the drilling sludges, very different from that of the sewage waters and the effluents from refineries, it is nevertheless possible to obtain the biological degradation of their polluting materials, in accordance with the invention, by the action of microorganisms, provided the particular microorganisms are "bred," so that they become capable of assuming this purpose.

The invention also includes the obtaining of microbial strains which are capable of being developed in the mineral oil drilling effluents and of degrading those materials contained therein which are the cause of a strong BOD of these effluents. According to one of the features of the invention, this preparation of the strains consists in seeding the effluent with microorganisms taken from conventional treatment basins, and "breeding" generations of these microorganisms in aerated medium, to which are added the nutritive elements, lacking in the effluent, particularly compounds of nitrogen and phosphorus. After the time which is necessary for the development of the useful microorganisms, which time may be several days, possibly with successive reseeding operations, the medium which includes the strains thus "formed" is added to the total volume of the effluent to be treated. After several hours, during which air is dispersed in the treated liquid, the latter has a BOD which is lower than 40 mg/l, thus satisfying the existing regulations. Obviously, if it should be necessary, the effluent as thus purified is then subjected to decantation and/or to a physicochemical treatment, before being discharged into the natural surroundings.

In the application of the new method to the treatment of the effluent of a given drilling operation, the initial step is to cultivate the appropriate microorganisms, as indicated above, in a portion of this effluent, of which the pH has been adjusted to a value from 6 to 8, preferably close to 7, and quite generally to the pH which is best suitable for these useful microorganisms. Nutritive substances are added to the medium. In the most usual case, where the pollutant to be biologically degraded is an organic material, as is the case with lignosulphonates, biopolymers and similar adjuvants, used in the drilling operations, the only nutritive substances are nitrogen compounds and phosphorus compounds, accompanied by oligoelements. These compounds may with advantage be used in the form of fertilisers which contain nitrates, ammonium salts and phosphates. The nitrogen is preferably supplied at the rate of 40 to 60% in the ammoniacal form with 60 to 40% of nitrogen in nitric form. The preferred quantities of nutritive substances are such that about 5 mg of nitrogen and 1 mg of phosphorus are provided per liter of the culture medium, for 100 BOD.

The culture is effected under aerobic conditions. Starting with the culture as thus obtained, it is possible to isolate the useful strains, bringing them for example into a lyophilised form, in known manner, so as to be able to make use thereof each time that there is present an effluent of like or similar nature, containing the same drilling adjuvants.

For example, it is thus possible to prepare in advance strains of microorganisms raised in sludges containing lignosulphonates or biopolymers; these strains are then used for the treatment of the effluents which contain these substances.

Whether the useful strains are prepared in advance in the pulverulent state, or even in the form of an aqueous volume of the effluent itself, they are mixed with the drilling effluent to be treated after the pH of this latter has been adjusted to the most propitious value for the development of these microorganisms.

The drilling effluents contain clays, which it is preferable to eliminate, at least for the major part, prior to the biological treatment. On the other hand, particularly with the lignosulphonates, they are often alkaline; the acidification thereof is then carried out, this having the effect of precipitating the clays. This flocculation of the clays can be carried out at a pH of the order of 5, which can be achieved by adding a suitable quantity of sulphuric acid. After separation of the clays, the effluent is subjected to the seeding and the culture, as indicated above. The strain is left to develop during the time necessary for the biodegradation of the pollutants which are present, that is to say, on average 5 to 10 hours. During this development, air is continuously dispersed in the liquid, for example, by means of a fan or turbine, and care is taken that the medium always contains the necessary nutritive materials, which may be ammonium nitrate, ammonium sulphate and ammonium phosphate, etc; if it is necessary, these materials are periodically added to the treated medium.

When the BOD of the medium has fallen to the required value, the aeration is stopped and decantation is allowed to take place; the supernatant, purified water is sent into a physicochemical treatment basin, if this is necessary, or is even rejected into the natural surroundings. The remaining sludges, which contain the useful microorganisms, are then made up with a fresh volume of effluent to be treated, brought beforehand to the required pH. A new development period has thus started and the operation is repeated throughout the entire time that there is effluent to be purified. It is obvious that a part of the sludges is periodically eliminated.

For the adaptation to the biodegradation of the polluting materials contained in the drilling effluents, it is possible to proceed to the breeding in the manner described above of different bacteria and moulds, as for example Alternaria, Aspergillus, Cephalosporium, Fusarium, Trichoderma, Pseudomonas, Corynebacterium, Flavobacterium, Micrococcus, Mycobacterium, Achromobacter Chromobacter and Bacterium; for the effluents which contain hydrocarbons, the Corynebacterium, Nocardia, Candida, Pseudomonas, Actinomyces, Aspergillus, *Penicillium glaucum*, Monilia, etc., are particularly visualised. The time of adaptation moreover varies with the nature of the microorganism or microorganisms. However, the most practical means consists in taking in the lump all the microorganisms present in the "activated" sludges of a conventional cleansing installation operating on sewage waters.

The invention is illustrated by the following non-limiting examples.

EXAMPLE 1

Preparation of a culture of microorganisms capable of degrading the adjuvants of drilling fluids Into a basin with a capacity of 200 cubic meters are introduced 100 cubic meters of clean water, 20 cubic meters of activated sludges, emanating from an adjoining purifying installation, that is to say, sludges which contain a collection of microorganisms useful for the biodegradation of organic waste materials. On the other hand, to the drilling effluent, containing biopolymers which have served as a protective colloid (heteropolysaccharides of the type known under the trade mark KELZAN XC), during the drilling, is added sulphuric acid until the pH is about 5. There is then produced a flocculation of the clays present in the effluent: the supernatant liquid is separated therefrom by decantation.

80 Cubic meters of this liquid are brought to pH 6.8 and introduced into the aforementioned basin; their BOD amounts to 300 mg of $O_2$/liter.

Ammonium phosphate is added to the mixture, so that there are 15 mg of nitrogen per liter. By means of a turbine, air is caused to be dispersed intermittently in the liquid in the basin; the temperature is 21° C.

The BOD of the liquid taken from the basin is measured twice per day. After 5 days, this value has fallen to 10 mg/l, and a fairly abundant mycelium has been formed in the liquid. The cleansing action has thus been very powerful and the microorganisms, well adapted to the effluent being used, have been developed.

The contents of the basin are then ready to function as a strain or stock for the treatment of fresh portions of drilling effluent. It is applied in examples 3 to 7 which are given below.

EXAMPLE 2

The preparation of a useful strain of microorganisms is carried out as in Example 1, but with an effluent which contains lignosulphonates. Its BOD is 500 mg/l. The adaptation of the microorganisms requires 7 days; after this time, the BOD of the contents of the basin is 38. The culture thus obtained is suitable for purifying effluents charged with lignosulphonates; it is used in Examples 9 to 11.

EXAMPLES 3 to 7

On to the sludge deposited in the basin, in Example 1, are poured 100 cubic meters of drilling effluent which contains biopolymers, the pH of this liquid having been brought beforehand to about 7, after the acidification with sulphuric acid and separation of the clays, as described in Example 1. Ammonium nitrate is added to the mixture at the rate of 5 mg of nitrogen per liter for 100 units of BOD.

Air is continuously dispersed in the liquid by means of a turbine for 6 hours. The BOD of the medium is then determined; when it becomes lower than 40, the operation of the turbine is stopped and decantation is allowed to take place, this generally taking one hour. A volume of the order of 75 cubic meters of supernatant material is then drawn off, in order to be physicochemically treated.

To the remaining sludge are again added 100 cubic meters of effluent and the operations as described above are repeated. It is in this way possible daily to treat 3 times 100 m$^3$ of an effluent with an initial BOD of 120, which is lowered as a consequence of the treatment to a value of 8, this representing a purification of 93%.

Examples 4 to 7 are carried out under the same conditions, but starting with effluents having variable BOD and COD values. In each case, initial and final COD values are determined at the same time, for comparing them with the BOD values.

In Examples 6 and 7, the contents of hydrocarbons before and after the treatment according to the invention have also been measured: this has made it possible to establish that this treatment permits the said content to be lowered to below the limit permitted by the regulations. The following table gives the results of Examples 3 to 7.

|  | Examples | | | | |
|---|---|---|---|---|---|
|  | 3 | 4 | 5 | 6 | 7 |
| Initial BOD | 120 | 174 | 145 | 300 | 220 |
| final BOD | 8 | 13 | 9 | 10 | 18 |
| purification % | 93 | 93 | 94 | 97 | 92 |
| initial COD | 218 | 260 | 220 | 244 | 348 |
| final COD | 40 | 20 | 20 | 50 | 100 |
| purification % | 82 | 92 | 91 | 80 | 71 |
| initial hydrocarbons mg/l | — | — | — | 20 | 6 |
| final hydrocarbons | — | — | — | 4 | 2 |
| purification % | — | — | — | 80 | 67 |

It is seen that the treatment in accordance with the invention, excellent as regards the BOD, is still very suitable for the elimination of the chemical oxygen demand and for the purification of the hydrocarbons.

EXAMPLE 8

By way of comparison, an effluent containing biopolymers was subjected to a single conventional physicochemical treatment. For this purpose, the effluent was treated with 1 mg/l of FeCl$_3$, 1.5 mg/l of lime and 1 mg/l of polyacrylamide (NALCO), as organic polyelectrolyte. The following results were recorded.

|  | Before treatment | After | Purification % |
|---|---|---|---|
| BOD | 145 | 125 | 14% |
| COD | 220 | 180 | 18% |

It is seen that, without previous biological treatment, the physicochemical purification is quite insufficient. If these figures are compared with Example 5 in respect of the same effluent, it is possible to establish the superiority of the biological treatment in accordance with the invention as compared with the conventional method.

EXAMPLES 9 to 11

Using three different effluents, containing lignosulphonates, an experiment was carried out in respect of the purification by the process according to the invention, on the one hand, and by the conventional physicochemical method, on the other hand. For this purpose, using a volume of each effluent, the biological treatment is carried out, as in the preceding examples (BT), while with another volume of the same effluent, the known physicochemical treatment (PCT) is carried out, this consisting in mixing FeCl$_3$ with the liquid at the rate of 1 mg/l, lime in the concentration of 1.5 mg/l, and also 1 mg/l of NALCO polyacrylamide (organic polyelectrolyte).

The following table gives the results of these treatments:

| Example | 9 | | 10 | | 11 | |
|---|---|---|---|---|---|---|
|  | BT | PCT | BT | PCT | BT | PCT |
| BOD of water before treatment | 500 | | 230 | | 145 | |
| BOD after treatment | 100 | 200 | 58 | 141 | 29 | 83 |
| % of purification | 80 | 60 | 75 | 39 | 80 | 43 |

It is apparent from these tests that the process according to the invention makes it possible for the purification to be extended to 80%, in the presence of lignosulphonates, whereas it is scarcely possible to exceed 60% solely by the physicochemical treatment.

EXAMPLES 12 to 15

In this series of tests, also relating to drilling effluents which contained lignosulphonates, each volume to be treated had applied thereto first of all the method according to the invention (BT) and then the usual physicochemical treatment (PCT), which consisted in the flocculation with 1 mg/l of aluminium sulphate, 1 mg/l of Ca(OH)$_2$ and 1 mg/l of the same organic polyelectrolyte as indicated above.

Of course, before the biological treatment, the pH was brought to a value close to 7 after the acidification with sulphuric acid, as in the preceding tests.

The following table gives the results of these tests:

| Example | 12 | | 13 | | 14 | | 15 | |
|---|---|---|---|---|---|---|---|---|
| Treatment | BT | BT +PCT | BT | BT +PCT | BT | BT +PCT | BT | BT +PCT |
| BOD before treatment |  | 405 |  | 280 |  | 230 |  | 145 |
| BOD after treatment | 113 | 27 | 56 | 17.5 | 58 | 8 | 29 | 9 |
| purification % | 72 | 93 | 80 | 94 | 75 | 97 | 80 | 94 |
| COD before treatment |  | 2080 |  | 980 |  | 1250 |  | 980 |
| COD after treatment | 1500 | 404 | 1000 | 280 | 1250 | 480 | 800 | 300 |
| purification % | 28 | 81 | — | 65 | 0 | 62 | 19 | 69 |
| material in suspension before treatment |  | 685 |  | 430 |  | 600 |  | 400 |
| material in suspension |  |  |  |  |  |  |  |  |

-continued

| Example | 12 | | 13 | | 14 | | 15 | |
|---|---|---|---|---|---|---|---|---|
| after treatment | 1140 | 0 | 1110 | 5 | 730 | 0 | 450 | 0 |
| purification % | — | 100 | — | 99 | — | 100 | — | 100 |
| hydrocarbons before treatment | | 12 | | — | | 10 | | 26 |
| hydrocabons after treatment | 6 | 3 | — | — | 2 | 0 | 12 | 4 |
| purification % | 50 | 75 | — | — | 80 | 100 | 54 | 85 |

It is apparent from these experiments that the succession of the two treatments, BT and then PCT, leads to very good results in all respects: this is particularly as regards the BOD and the COD, the material in suspension and the hydrocarbons.

As regards the BOD, it is the treatment according to the invention which is of prime importance, because it is this treatment, contrary to the PCT (to be compared with Examples 9 to 11) which produces the best reduction in the biochemical oxygen demand. Against the chemical demand, it is the physicochemical treatment which is the most efficient. The same applies as regards that which affects the material in suspension, this being normal, since the biological treatment leads to the formation of mycelium. The elimination of the hydrocarbons is for the major part assured by the treatment according to the invention, but it is advantageously completed by the physicochemical treatment.

In conclusion, these results show that the combination of the two treatments leads to an excellent purification, which brings the effluents well below the authorised standards.

We claim:

1. A method of purifying effluent from oil well drilling in order to degrade polysaccharide and lignosulfonates drilling adjuvants contained therein which comprises:
   a. acidifying said effluent to precipitate clay contained therein;
   b. separating the precipitate thus formed;
   c. bringing the liquid separated from the clay to about neutral pH;
   d. mixing said neutralized liquid with a bacterial culture obtained by aerobic growth of sewage or soil bacteria in an aqueous medium which contains oil well drilling additive and nutrient substances bearing only nitrogen and phosphorus exclusive of carbon;
   e. adding additional nitrogen and phosphorus bearing nutrient substances necessary for bacterial growth to said mixture and allowing the resulting mixture to stand in aerobic condition until the bacteria have substantially grown and until the biochemical oxygen demand of the mixture is decreased to below a predetermined limit;
   f. separating the purified liquid produced in (e) from the mixture, and recovering a fraction of the remaining bacteria mycelium; and
   g. mixing the purified liquid separated in step (f) with conventional chemical flocculating agents and separating the precipitate formed thereby.

2. Method according to claim 1, wherein the growth of the bacteria (e) is allowed to continue until the biochemical oxygen demand of the liquid does not exceed 40 mg/l.

3. Method according to claim 1, wherein the growth of the bacteria (e) is allowed to proceed for 5 to 10 hours at ambient temperature.

4. Method according to claim 1, in which the acidifying (a) is carried out to bring the pH of the effluent to a value of about 5, while in the subsequent neutralization (c) the pH is adjusted to about 6 to 8.

5. Method according to claim 1, in which the nutrient substances, added to the liquid of said bacterial culture, are mixed in an amount such that there be about 5 mg of nitrogen and about 1 mg of phosphorus added per liter, per 100 mg/l of biochemical oxygen demand.

6. Method according to claim 5, in which 40 to 60% of the nitrogen of the nutrient substance added is in nitric form and respectively 60 to 40% in ammonia form.

7. A method according to claim 1, in which said flocculating agents are a ferric salt or an aluminum salt, and chalk, and are employed in an amount sufficient to bring the biochemical oxygen demand to a value below 20 mg./l.

* * * * *